Oct. 13, 1936.　　　D. L. RIOUX　　　2,057,249

ILLUMINATED LICENSE PLATE HOLDER

Filed July 18, 1934

INVENTOR
Demcy L. Rioux
BY Larry W. Johnson
ATTORNEY

Patented Oct. 13, 1936

2,057,249

UNITED STATES PATENT OFFICE 2,057,249

ILLUMINATED LICENSE PLATE HOLDER

Demcy L. Rioux, Green Bay, Wis.

Application July 18, 1934, Serial No. 735,868

5 Claims. (Cl. 40—130)

My invention relates to a license plate holder and more particularly to an enclosed type of license plate holder that can be illuminated to further permit identification of the license number in the dark.

An object of the invention is to provide a device of the telescopic type that will display and encase the license plate, while protecting it from all elements as well as to guard it against removal without the owner's consent.

Another object of the invention is to provide a container to encase the license plate and permit its being sealed by the authorities thereby prohibiting the use of the license plate on another vehicle.

Still another object of the invention is to provide a protective holder for any type of license plate either with perforated digits having the light and reflector behind it or a printed plate with the light reflected against its face.

With the above and other objects which will be apparent as the detailed description proceeds my invention consists of the following new and novel features fully described, illustrated and pointed out in the appended claims.

Figures 1, 2, 3:
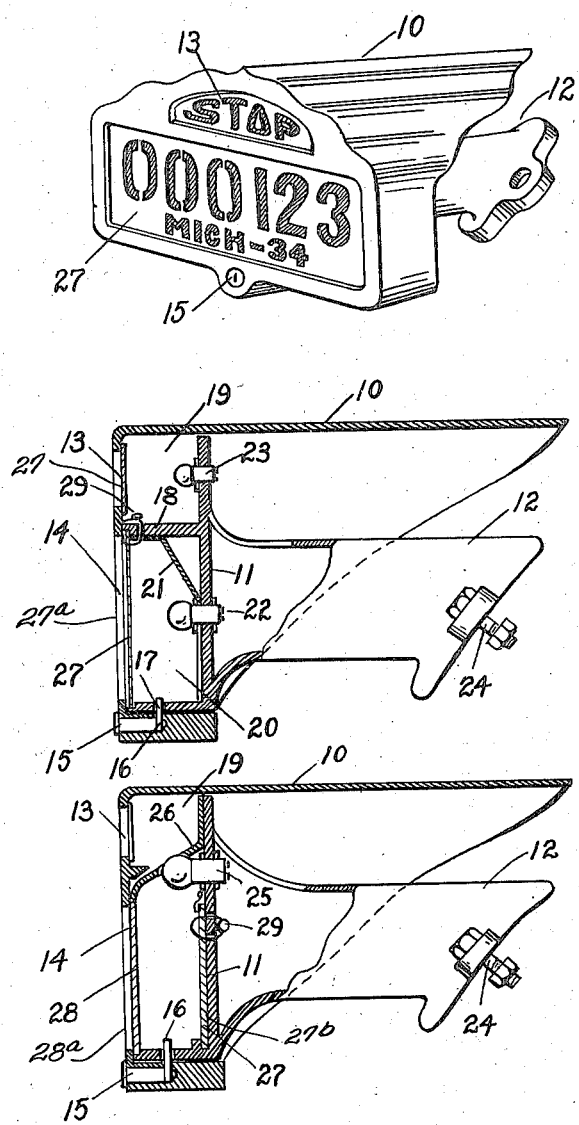
Fig. 1 shows a perspective view of the device.
Fig. 2 shows a fragmentary cross sectional view of the device incorporating a plurality of lights.
Fig. 3 shows a fragmentary cross sectional view of a modified construction using a single light for both compartments.

Referring to the drawing in detail, wherein like characters of reference denote corresponding parts, the embodiments of the invention are each generally comprised in a casing formed to provide an outer removable part 10 and an inner fixed part 11 which is carried by an attaching bracket 12 and adapted to be substantially enclosed by the outer part when in assembly.

The inner casing part 11 is formed of a vertical wall 11a, a bottom horizontal wall 11b, and an intermediate horizontal partition wall 18; the walls 11b and 18 being on the side of the wall 11a opposite its point of support from the bracket 12.

The outer casing part 10 is made up of a substantially rectangular portion to engage over and enclose the inner casing part 11, and has a vertical front wall 10a which abuts the opposed edges of the horizontal walls 11b and 18 of the inner casing part when in place, thus forming two compartments 19 and 20 within the completed casing. The vertical wall 10a is provided with two apertures, one, as at 13, opening into the upper compartment 19, and the other, as at 14, into the lower compartment 20.

The outer casing part 10 has a bottom wall 10b, preferably of a greater thickness than the other of its walls, to closely underlie the bottom horizontal wall 11b of the inner casing part 11 and it is provided with a lock 15, preferably of a key operated type, which has a bolt 16 to enter a slotted opening 17 in the bottom wall 11b to secure the outer casing part in place on the inner casing part, so that unauthorized access may not be had to the interior of the casing once it has been installed for use.

In the form of the device as shown in Figure 2, the upper aperture 13 is closed by a transparent stop signal plate 27 and the lower aperture 14 by a license plate 27a which is preferably formed with digit cutouts or perforations and backed by a transparent material 28, such as celluloid or the like. This material 28 may be made plain, or of any color in contrast to the outer face of the license plate 27a to accord with legal requirements.

Mounted on the vertical wall 11a within the compartments 19 and 20 of this form of the device are lamp bulbs 23 and 22 respectively and these are to be illuminated as required from the usual current source of a motor vehicle equipped with the signal plate holder. A reflector 21 is positioned within the compartment 20, in angular relation to the lamp bulb 22, to direct light onto the rear side of the transparency 28 and outwardly through the cutouts or perforations of the license plate 27a.

Also, in this form of the invention, the license plate 27a is preferably secured in place at the aperture 14 and to an adjacent portion of the inner casing part 11, as for instance, to the partition wall 18, by means of a seal or the like 29, to prevent its unauthorized removal or theft.

As shown in Figure 3, the holder is modified for the display of an imperforate type of license plate 27b and, here, but a single lamp bulb 25 is employed on the vertical wall 11a of the inner casing part 11, and a reflector 26 is substituted for the partition wall 18 (Figure 2) to divide the interior of the casing part 11 into the two compartments 19 and 20.

In this instance, a plate or sheet of transparent material 28a, such as glass or the like, is placed over the aperture 14 in the front wall 10a of the outer casing part 10 and an ordinary license plate 27b is emplaced against the vertical wall 11a and in line with the plate or sheet 28a; a suitable fastening means 29a, such as the seal shown, being employed to secure the license plate in proper position and against unauthorized removal or theft. The reflector 26 is preferably apertured at a proper point, with respect to the lamp bulb 25, that a portion of the light will pass therethrough and illuminate the stop signal plate 27. Also, the reflector is angularly arranged with respect to the stop signal plate 27 and the license plate 27b that both of the same will be fully illuminated by the one light source and sufficiently so as to be readily visible through the apertures 13 and 14 from a point remote from the rear of the vehicle upon which the holder is installed.

In the use of the combined stop signal and license plate holder shown in Figure 2, the lamp 23 is to be controlled from a switch (not shown) to be operated in a usual manner from the brake pedal on the vehicle, while the lamp 22 will be independently controlled as desired from a switch (not shown) on the vehicle dash. However, in the form of the device as in Figure 3, the lamp 25 is preferably of an ordinary dimmer type and is controlled from the vehicle dash to normally illuminate the signal plate 27 and the license plate 27b at its lower light intensity, and from the brake pedal switch (not shown) to illuminate the plates 27 and 27b at its higher light intensity whenever the brakes of the vehicle are applied.

The drawing illustrates only two methods of mechanical construction but the right is reserved to make such minor changes as may be desired but still keeping within the scope of the appended claims.

Having thus described my invention what I claim and desire to secure by Letters Patent in the United States, is:

1. A license plate holder, comprising an inner casing part having a vertical wall and an angled bottom wall and an outer casing part to engage over and enclose the inner casing part, the outer casing part having a front wall provided with an aperture for exposure therethrough of a license plate carried by the inner casing part, a light source carried by the vertical wall of the inner casing part, a reflector within the inner casing part and angularly arranged with respect to the light source to direct light upon the license plate, a lock carried by the bottom wall of the outer casing part and having a movable bolt adapted to engage an opening in the bottom wall of the inner casing part, and means carried by the inner casing part for attaching it to a vehicle.

2. The device as set forth in claim 1, wherein the license plate is formed with digit cutouts and the light source and reflector are disposed behind the same for the emission of light outwardly of the cutouts, and a transparency is positioned between the license plate and the light source, the transparency being of a given color to contrast with that of the exposed face of the license in accordance with legal requirements.

3. The device as set forth in claim 1, wherein the inner casing part has its vertical wall provided with an angled partition wall in spaced relation to and above its bottom wall to form upper and lower compartments and the license plate and the light source therefor is housed within one of the compartments, while a stop signal plate and a separate light source therefor is housed within the other of the compartments, and the front wall of the outer casing part is provided with a second aperture for exposure therethrough of the stop signal plate.

4. The device as set forth in claim 1, wherein the outer casing part is provided with an extended portion to partially enclose the said attaching means of the inner casing part for its protection from the elements.

5. The device as set forth in claim 1, wherein the reflector is spaced above the bottom wall of the inner casing part to form compartments above and below the same and the license plate and the light source is located in one of the compartments, the front wall of the outer casing part is provided with a second aperture to expose therethrough a stop signal plate positioned within the other of the compartments, and the reflector is provided with an opening to pass a portion of the light from the light source into the other compartment for the illumination of the stop signal plate.

DEMCY L. RIOUX.